United States Patent [19]

Denece et al.

[11] Patent Number: 5,254,145
[45] Date of Patent: Oct. 19, 1993

[54] CENTRIFUGAL OIL DE-AERATOR

[75] Inventors: Franck R. D. Denece, Moissy Cramayel; Jérôme M. Friedel, Sivry Courtry, both of France

[73] Assignee: Societe Nationale d'Etude et de Construction de Moteurs d'Aviation "SNECMA", Paris, France

[21] Appl. No.: 15,427

[22] Filed: Feb. 9, 1993

[30] Foreign Application Priority Data

Feb. 19, 1992 [FR] France ................ 92 01866

[51] Int. Cl.⁵ .............................................. B01D 19/00
[52] U.S. Cl. ........................................ 96/217; 55/404; 55/405; 210/512.3; 494/49
[58] Field of Search ................ 55/182, 184, 192, 194, 55/199, 201, 202, 203, 278, 393, 400, 404, 405; 494/49, 50; 210/512.3

[56] References Cited

U.S. PATENT DOCUMENTS

| | | | |
|---|---|---|---|
| 1,319,059 | 10/1919 | Funk | 55/404 |
| 1,438,553 | 12/1922 | Quam | 55/404 |
| 1,703,867 | 3/1929 | Bursley et al. | 55/404 X |
| 2,401,079 | 5/1946 | Jones et al. | |
| 2,747,793 | 5/1956 | Caddell | |
| 2,753,010 | 7/1956 | Walther | |
| 2,779,475 | 1/1957 | Olcott | |
| 4,563,198 | 1/1986 | Houtchens | |

FOREIGN PATENT DOCUMENTS

| | | |
|---|---|---|
| 249856 | 12/1987 | European Pat. Off. |
| 1249712 | 6/1959 | France |
| 278161 | 10/1927 | United Kingdom |
| 1036661 | 2/1964 | United Kingdom |

*Primary Examiner*—Charles Hart
*Attorney, Agent, or Firm*—Oblon, Spivak, McClelland, Maier & Neustadt

[57] ABSTRACT

A centrifugal oil de-aerator includes a centrifuging bowl which is mounted for rotation about its axis, and radial blades mounted within the bowl at one end such that the oil to be de-aerated can be projected as a jet onto the blades to cause the bowl to rotate at high speed to generate a de-aerating centrifugal force on the oil which is thrown outwards onto the inner surface of the bowl, the bowl being open at its end remote from the blades and the inner surface of the bowl widening out towards this open end.

3 Claims, 2 Drawing Sheets

5,254,145

CENTRIFUGAL OIL DE-AERATOR

BACKGROUND OF THE INVENTION

The invention relates to a device for de-aerating oil centrifugally.

In oil lubrication circuits in which bearings are sprayed with the oil to lubricate them, the oil is recovered and used again. However, the recovered oil is often heavily charged with air bubbles, which give rise to jerkiness in the jet of oil directed towards the bearing when the oil is supplied again to the lubrication nozzle. As this is undesirable, various devices have already been proposed for separating the oil from the air.

The simplest device consists of an inclined plane on which the oil flows for a period long enough for the air bubbles to burst at the surface of the oil layer. The drawback of this device is that, for the de-aeration time to be long enough in practice, the inclined plane needed is rather cumbersome.

Another device makes use of centrifugal action, U.S. Pat. No. 2,401,079 disclosing a device comprising a bowl arranged with its axis vertical and an oil inflow duct oriented tangentially to the wall of the bowl and opening into the bowl at the top of the wall.

The oil is thus delivered onto the inner face of the wall and flows around the wall, descending little by little, before exiting through the bottom of the bowl. The centrifugal forces produced by the rotation of the oil bring about an efficient separation of the air from the oil because of their very different densities, but it is necessary to impart a great amount of energy to the oil for it to rotate sufficiently around the wall of the bowl.

SUMMARY OF INVENTION

The invention is intended to provide an improved device for de-aerating oil by centrifugal action, and according to the invention there is provided a device for de-aerating oil comprising a bowl defining an axis of rotation and having first and second ends, means mounting said bowl for rotation about said axis, and a plurality of radial blades mounted within said bowl at said first end thereof such that oil to be de-aerated can be projected onto the blades to cause said bowl to rotate, said bowl being open at said second end remote from said blades, and said bowl having an inner face which widens out towards said second end.

In use, the oil delivered to the device causes the bowl to rotate by impacting against the blades and is thereby propelled outwards onto the inner surface of the bowl where it flows towards the second end, expressing the air which it contains as a result of the centrifugal forces generated by the rotation.

One embodiment of the invention, given by way of example, will now be described with reference to the attached drawings.

DESCRIPTION OF THE PREFERRED EMBODIMENT

Figure 1:
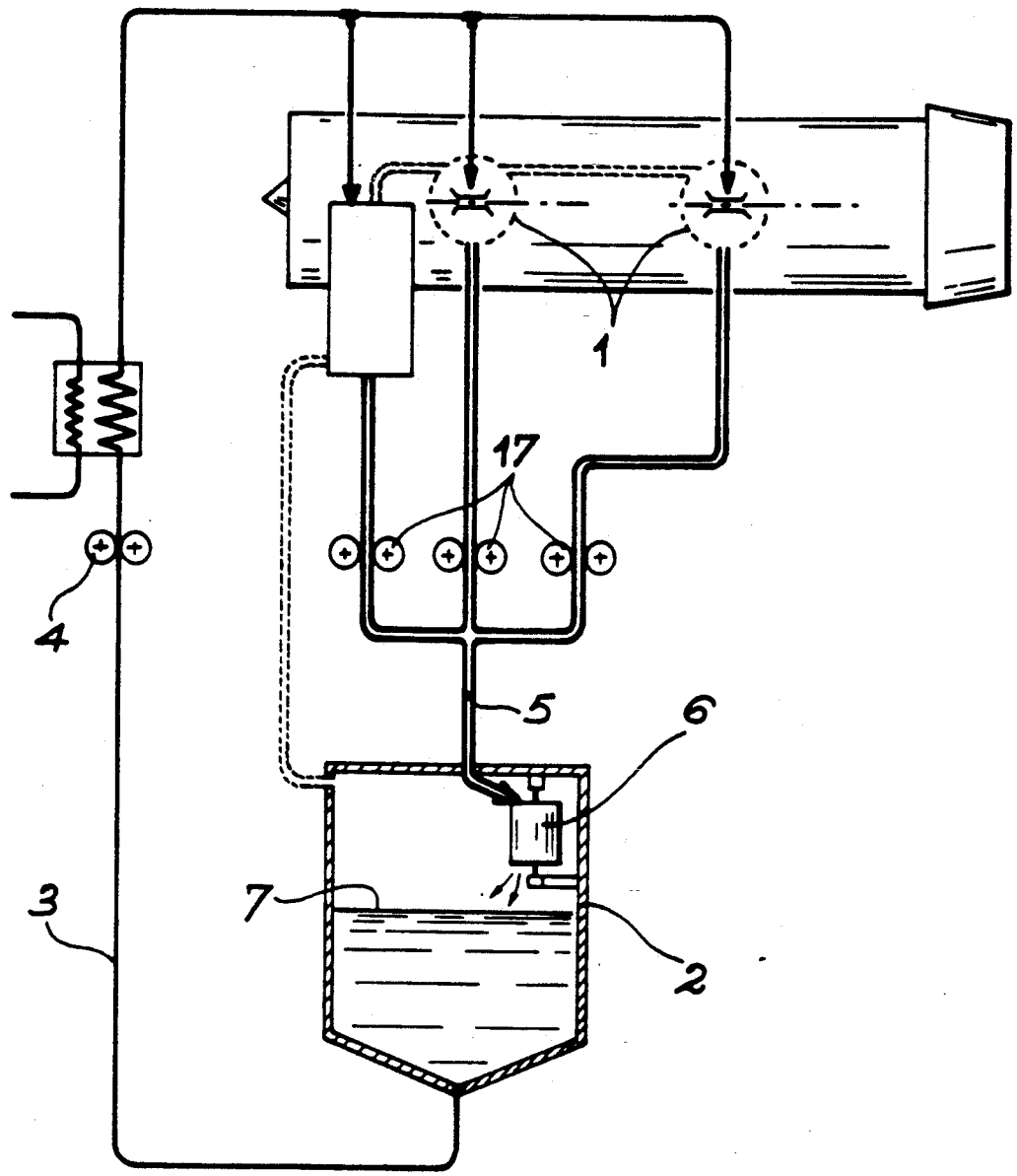
FIG. 1 is a diagram showing an oil circuit incorporating an oil de-aerator device in accordance with the invention.

FIG. 1 shows an oil circuit in which roller bearings 1 are lubricated by oil drawn from a reservoir 2 via a supply duct 3 by a pump 4, and the oil which is thrown back by the bearings is heavily charged with air bubbles and is returned to the reservoir 2 via a branched return duct 5 fitted with a recovery pump 17 in each branch. The reservoir 2 is provided with an oil de-aerator 6 in accordance with the invention near the top of the reservoir and above the surface 7 of the oil which collects in the reservoir, and the end of the return duct in the reservoir is formed as a nozzle 8 for delivering the returned oil to the de-aerator as a fine jet and at high speed.

Figure 2:
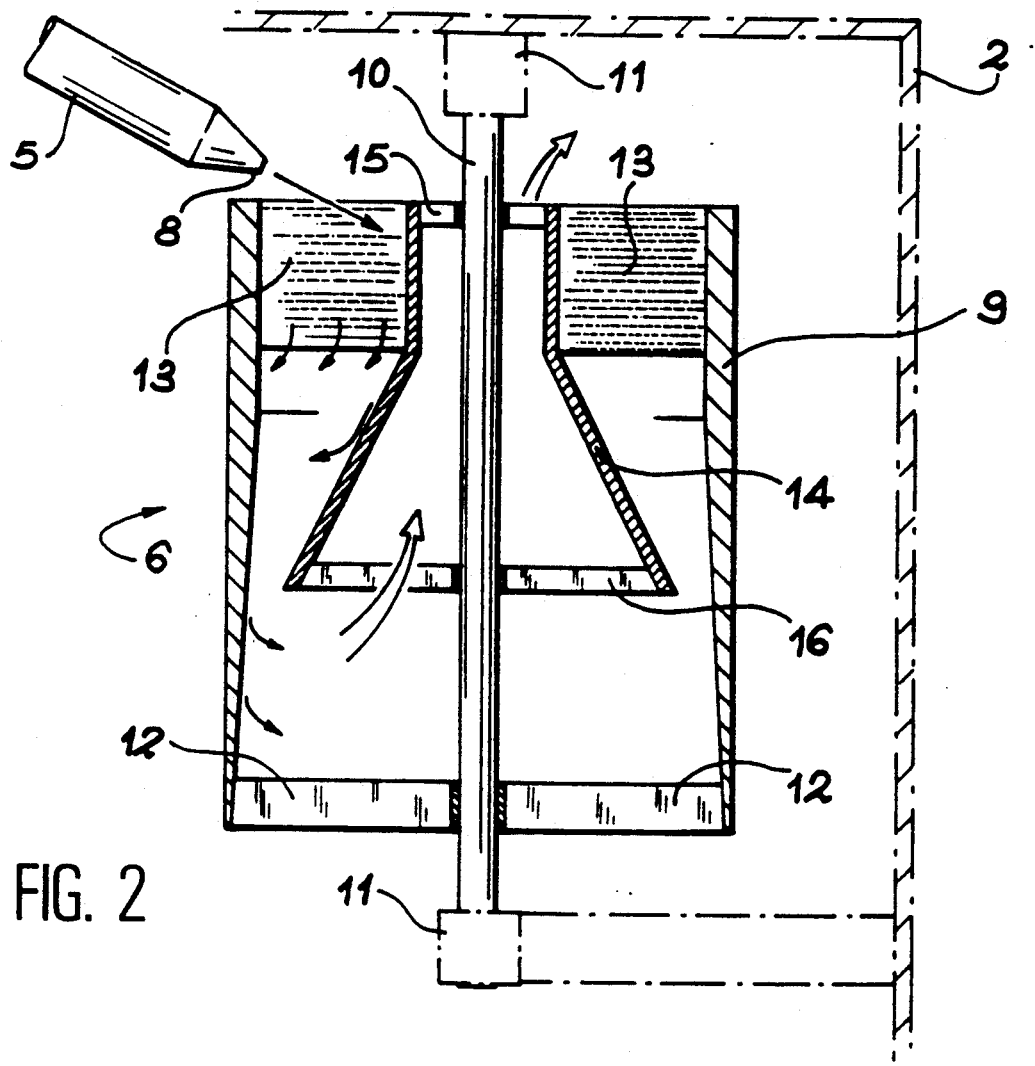
FIG. 2 is a longitudinal sectional view of the de-aerator device.
Figure 3:
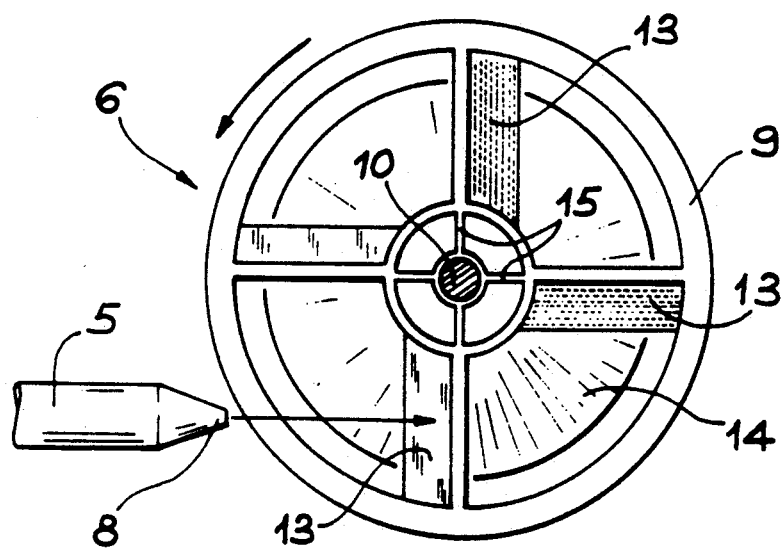
FIG. 3 is a top plan view of the de-aerator device.

As shown in FIGS. 2 and 3, the de-aerator 6 comprises a substantially cylindrical bowl 9 which is open at both ends and is mounted to rotate freely around a vertical axis by means of an axle 10 supported by bearings 11 connected to the wall of the reservoir 2. The bowl 9 is connected at its lower end to the axle 10 by a cross-strut 12, and is connected at its upper end to the axle 10 by means of four radial blades 13 which are evenly distributed around the bowl and are inclined relative to the vertical.

The oil duct 5 in the reservoir 2 is arranged so that the jet delivered by its nozzle 8 enters the de-aerator at its upper end and impinges on the blades 13 to cause the bowl 9 to rotate at high speed, the orientation of the nozzle and the inclination of the blades preferably being such that the jet impinges perpendicularly on each blade in a particular position of the blade as the bowl rotates. The oil rebounding from and coating the blades 13 inside the bowl 9 finally reaches the inner surface of the bowl, which widens out slightly towards the lower end so that the fast rotation of the bowl generates a downward force on the oil which assists the action of gravity in moving the oil to the lower end and causing it to drop therefrom into the oil collected in the lower portion of the reservoir. In fact, in most situations, the dimensions are such that the generated downward force is greatly superior to the gravitational force. The centrifugal forces generated by the rotation of the bowl 9 not only act to move the oil covering its inner surface towards the lower end as a result of the adherence forces due to the viscosity of the oil, but are also sufficiently great to bring about an effective de-aeration of the oil by centrifuging, since the recovery pumps 17 impart a great amount of energy to the returned oil which thus drives the de-aerator to rotate at very high speed. The liberated air escapes from the de-aerator 6 through the upper end of the bowl 9 and leaves the reservoir 2 via an overflow duct (not shown).

In this embodiment the de-aerator 6 also comprises an inverted funnel 14 which is surrounded by the bowl 9 and is also mounted on the axle 10 to rotate therewith. The inner ends of the blades 13 are fixed to the narrow upper end of the inverted funnel 14, which in turn is attached to the axle 10 by struts 15, and below the blades 13 the funnel 14 flares outwards and downwards until it almost touches the inner surface of the bowl 9. The funnel intercepts the oil droplets which have burst on the blades 13 and rebounded in a direction towards the axle 10, and acts to deliver them back outwards to arrive at speed on the inner surface of the bowl 9 and thus fully undergo the centrifugal de-aeration. The lower end of the funnel 14 is attached to the axle 10 by radial struts 16.

The basic advantage of the invention lies in that a powerful centrifuging effect is possible solely by utilisation of the power of the recovery pumps 17. No motor is required to rotate the centrifugal de-aerator 6, which is thus completely automatic.

The bursting of the oil jet into droplets on the blades 13 itself leads to a certain degree of separation of the air contained.

Also, the high rotational speed of the de-aerator causes the oil layer formed on the inner surface of the bowl 9 to be thinner than if the bowl were stationary as in the known centrifugal device described earlier, so that de aeration is more efficient and oil is moved along satisfactorily.

As the forces of gravity are normally of little importance relative to the forces produced by centrifugal action (speeds of several thousand revolutions per minute are possible if the oil jet is powerful and the de-aerator 6 is small), it is not essential for the blades 13 to be above the outlet end of the bowl 9. In other words, the axis of the bowl does not necessarily need to be vertical.

We claim:

1. A device for de-aerating oil comprising a bowl defining an axis of rotation and having first and second ends, means mounting said bowl for rotation about said axis, and a plurality of radial blades mounted within said bowl at said first end thereof such that oil to be de-aerated can be projected onto the blades to cause said bowl to rotate, said bowl being open at said second end remote from said blades, and said bowl having an inner surface which widens out towards said second end.

2. A device according to claim 1, further comprising a funnel mounted coaxially within said bowl for rotation therewith, said funnel widening in a direction towards said second end of said bowl.

3. An oil circuit including a device for de-aerating the oil, said device comprising a bowl defining an axis of rotation and having first and second ends, means mounting said bowl for rotation about said axis, and a plurality of radial blades mounted within said bowl at said first end thereof such that oil to be de-aerated can be projected onto the blades to cause said bowl to rotate, said bowl being open at said second end remote from said blades, and said bowl having an inner surface which widens out towards said second end, and means arranged to project the oil to be de-aerated onto said blades so that said bowl is caused to rotate and said oil is thereby propelled outwards onto and hence along said inner surface of said bowl to the open second end thereof.

* * * * *